United States Patent [19]
Goris et al.

[11] Patent Number: 6,109,902
[45] Date of Patent: Aug. 29, 2000

[54] LIQUID-INJECTED COMPRESSOR WITH AT LEAST TWO COOPERATING COMPRESSOR ELEMENTS

[75] Inventors: Joost Goris, Edegem; Philippe Ernens, Aubel, both of Belgium

[73] Assignee: Atlas Copco Airpower, naamloze vennootschap, Belgium

[21] Appl. No.: 09/005,756

[22] Filed: Jan. 12, 1998

[30] Foreign Application Priority Data

Jan. 15, 1997 [BE] Belgium ............................. 09700036

[51] Int. Cl.⁷ ......................................... F04C 18/00
[52] U.S. Cl. .............................. 418/201.1; 418/DIG. 1; 418/181; 55/522; 55/523; 55/525; 55/DIG. 13; 55/DIG. 42; 55/DIG. 14
[58] Field of Search ................. 418/DIG. 1, 201.1, 418/181; 55/522, 523, 525, DIG. 13, DIG. 42, DIG. 14

[56] References Cited

U.S. PATENT DOCUMENTS

| | | | |
|---|---|---|---|
| 2,204,814 | 6/1940 | Newell | 230/206 |
| 4,049,401 | 9/1977 | Smith . | |
| 4,714,139 | 12/1987 | Lorenz et al. . | |
| 4,755,103 | 7/1988 | Streifinger | 415/111 |
| 4,913,634 | 4/1990 | Nagata et al. | 418/201.1 |
| 5,222,935 | 6/1993 | Schlarb | 494/54 |
| 5,246,357 | 9/1993 | Sjoholm et al. | 418/201.1 |

FOREIGN PATENT DOCUMENTS

| | | |
|---|---|---|
| 0 649 997 | 4/1995 | European Pat. Off. . |
| 3 501 852 | 8/1985 | Germany . |
| 60-014920 | 1/1985 | Japan . |
| 60-101294 | 6/1985 | Japan . |
| 5-010283 | 1/1993 | Japan . |
| 2 186 030 | 8/1987 | United Kingdom . |

*Primary Examiner*—Thomas Denion
*Assistant Examiner*—Thai-Ba Trieu
*Attorney, Agent, or Firm*—Bacon & Thomas PLLC

[57] ABSTRACT

A liquid-injected compressor with at least two cooperating compressor elements (2 and 3) is provided. The compressor elements are mounted in a housing (1). At least one of the compressor elements is rotatable and is bearing-mounted with a shaft end (7, 8, 13, 14) in the housing (1). The compressor is provided with an inlet (22) and an outlet (17-18-19) which are connected to the inside of the housing (1). The shaft end (14) of the rotatable compressor element (3) is situated in the outlet (17-18-19) in the housing (1). At least one body (20 or 41), made of material which is permeable to gas, is fixed on this shaft (14), forming a filter which practically entirely seals the outlet (17-18-19) and only lets the compressed gas through.

27 Claims, 2 Drawing Sheets

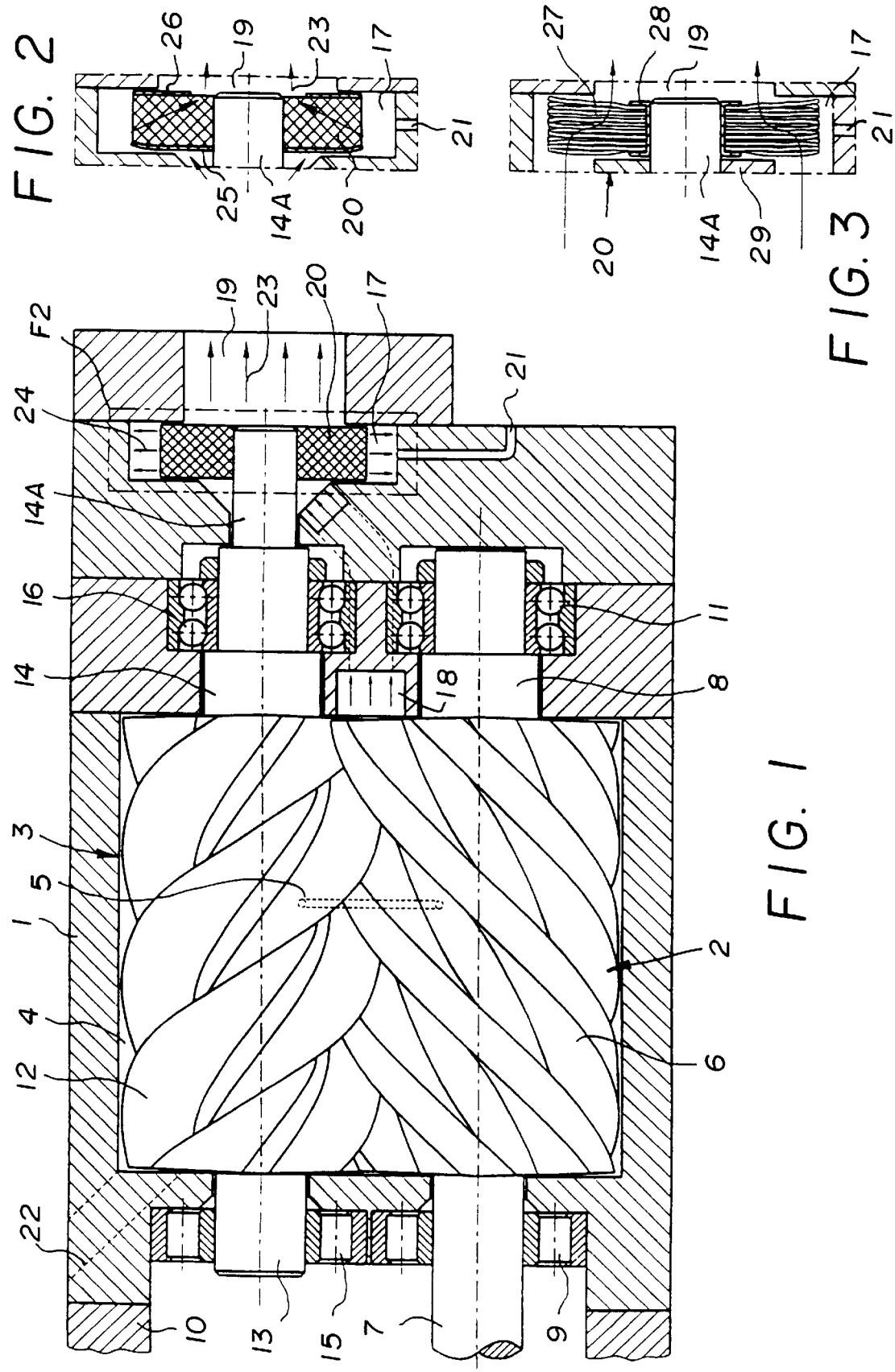

LIQUID-INJECTED COMPRESSOR WITH AT LEAST TWO COOPERATING COMPRESSOR ELEMENTS

The present invention concerns a liquid-injected compressor with at least two cooperating compressor elements which are erected in a housing and of which at least one can be rotated and is bearing-mounted with at least one shaft in the housing, whereby the compressor is provided with an inlet and an outlet which are connected to the inside of the housing.

With liquid-injected compressors, in particular screw-type compressors, oil or water is used as a lubricant between the two compressor elements.

In the compressed gas, usually air, are situated particles of this lubricating liquid, which is unacceptable for many applications.

That is why a separation system is connected to such known compressors to separate the lubricating liquid from the compressed gas.

Such a separation system contains an air receiver into which the outlet of the compressor opens tangentially. Due to the centrifugal forces there is a first separation which is reinforced by the gravitational effect caused by the different densities of the gas and the lubricating liquid. The further separation occurs in a coalescence filter.

Such a separation system is voluminous. Moreover, the air receiver has to be approved and as a sound source it raises the noise level of the compressor.

The present invention aims a liquid-injected compressor which does not represent the above-mentioned and other disadvantages and thus enables an efficient separation of the compressed gas and the lubricating liquid without a voluminous separation system being required.

This aim is reached according to the invention in that a shaft of a rotatable compressor element is situated in the outlet in the housing and in that at least one body, in particular a disc, made of material permeable to gas, is fixed on this shaft, forming a filter which practically entirely seals the outlet and only lets the compressed gas through.

The flow resistance of this body for the compressed gas is sufficiently low in order to let the gas under pressure through. Fluid particles, however, are retained on the body and, due to its rotation, are radially flung away at high speed and are collected.

This body may consist of cellular material with open cells, of a brush or of other material which is permeable to gas such as fibrous material and/or a tissue, for example woven metal wire, either or not in combination with a fibrous material such as glass fibre and/or synthetic fibre.

The body can even be made of several layers surrounding one another, for example an outer ring-shaped layer of woven metal wire and an inner ring-shaped layer made of a combination of woven metal wire and fibrous material.

Thus, a too large pressure drop in the body can be avoided.

The body is preferably situated in a chamber formed of a widening of the inlet.

In the outlet can be erected two or several bodies which are permeable to gas. In order to make the body rotate with blank contact, an axial play is required between said body and the walls of the outlet of the chamber in which it is provided. This play must also absorb tolerances, thermal expansions and the axial turn of the body. Given the high speed, the contact of the body with a wall would cause much wear, especially on the side of the outlet of the body, as there is little lubrication there.

Thanks to said play, a part of the air/liquid mixture can end up directly in the outlet, which has a negative effect on the liquid separation. When the compressor comes to a standstill, liquid situated on the walls around the body may drip along this body via the play and will be carried along with the air when the compressor is started up again.

In order to remedy these disadvantages, means can be provided in an embodiment according to the invention to make the flow of compressed gas through the body flow at least partially towards the geometrical axis of rotation of said body.

Preferably, the end of the shaft in the outlet is provided with a passage for the compressed air which opens radially in the body on the one hand and which opens in the outlet downstream of said body on the other hand.

In order to better explain the characteristics of the invention, the following preferred embodiment of a liquid-injected compressor according to the invention is described as an example only without being limitative in any way, with reference to the accompanying drawings, in which:

FIG. 1 schematically represents a section of a compressor according to the invention;

FIG. 2 shows the part which is indicated by F2 in FIG. 1, but with reference to another embodiment of the invention;

FIG. 3 shows the part of FIG. 2, but with reference to yet another embodiment;

Figure 5:
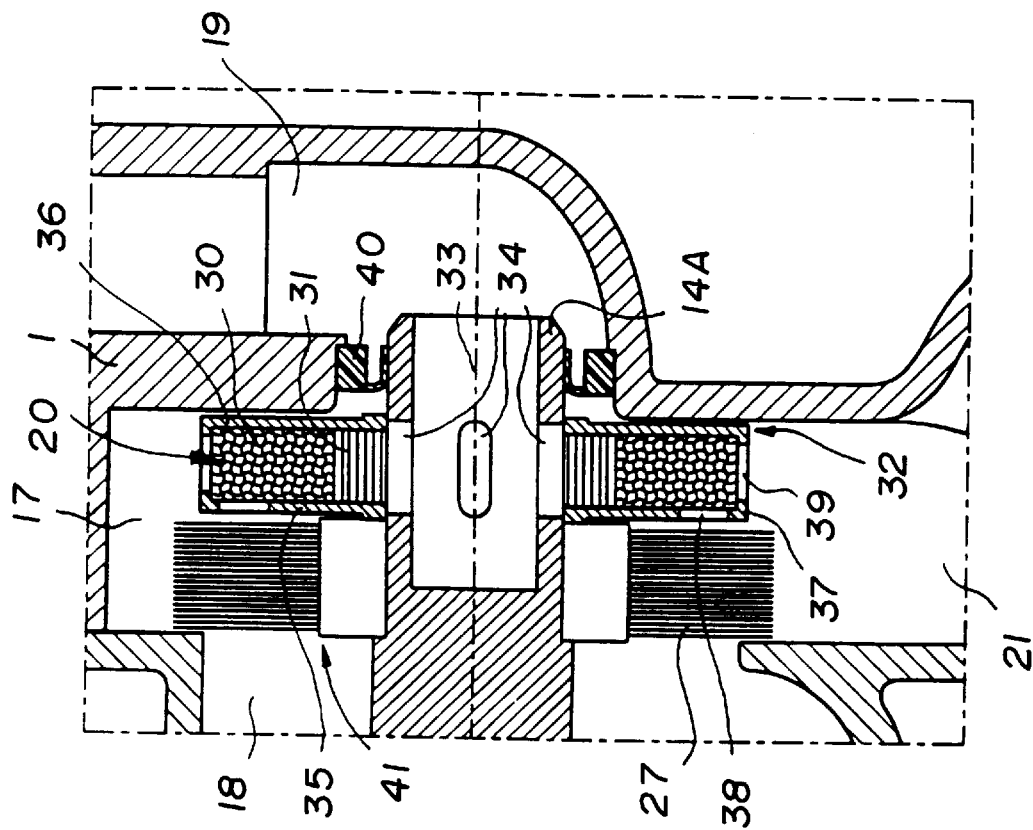
Figure 4:
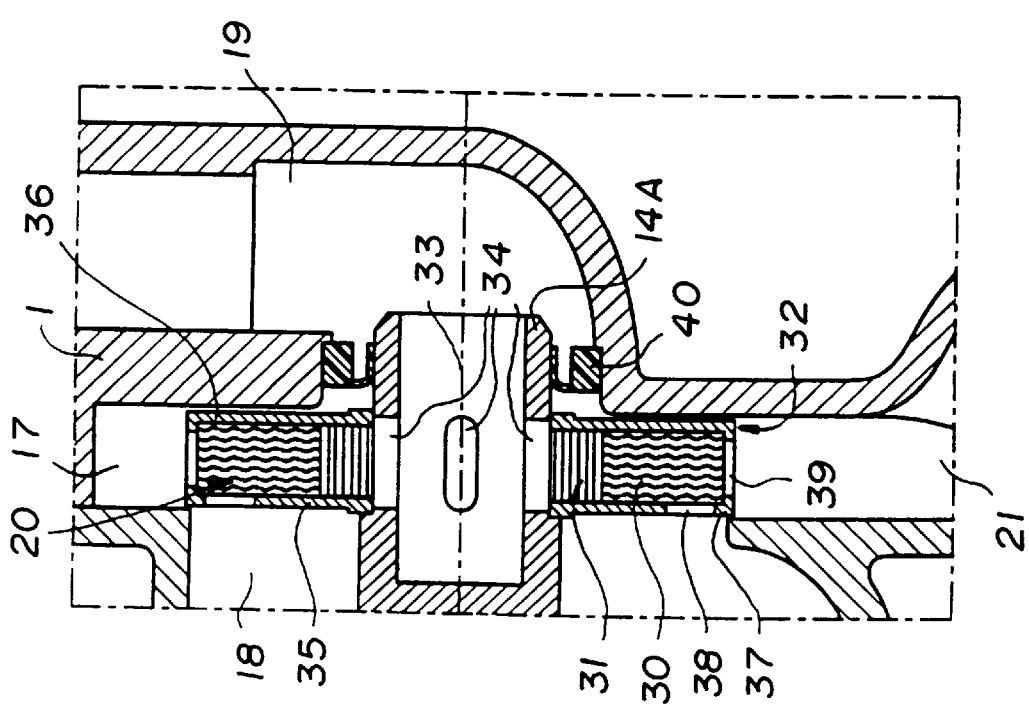

FIGS. 4 and 5 each show a part of the compressor analogous to that in FIGS. 2 and 3, but with reference to yet other embodiments.

FIG. 1 represents a one-stage screw-type compressor which mainly consists of a housing 1 in which two compressor elements 2 and 3 formed of helical rotors are mounted in a rotatable manner.

In view of the design, the housing 1 consists of various parts which are fixed to one another by means of for example bolts.

The housing 1 circumscribes an inner room 4 in which the rotating compressor elements 2 and 3 are situated.

Lubricating liquid, i.e. oil or water, is injected in the room 4 on the compressor elements 2 and 3 via a duct 5.

The rotating compressor element 2 consists of a helical body 6 which is axially provided with a shaft 7, 8 respectively, on both ends.

The shaft 7 is supported on a bearing 9 which is mounted in the housing 1 and it is connected to a drive, for example the outgoing shaft of a motor or of a transmission, which is not represented in FIG. 1, mounted in a cabinet 10 which is mounted on the housing 1.

The shaft 8 is bearing-mounted in a ball bearing 11 which is incorporated in the housing 1.

In an analogous manner, the rotating compressor element 3 contains a helical body 12 and a shaft 13, 14 respectively on both ends thereof.

The shaft 13 is bearing-mounted in a bearing 15 which is fixed in the housing 1 on the side of the cabinet 10.

On the other side, the shaft 14 is bearing-mounted in a ball bearing 16 which is incorporated in the housing 1.

This shaft 14 extends with an elongated end 14A past the ball bearing 16, namely in a round chamber 17 which is formed in an end wall of the housing 1, which end wall is thicker on the side of the ball bearings 11 and 16 than on the opposite side.

This chamber 17 is part of the outlet 17-18-19. The part 18 of the outlet connects the chamber 17 to the room 4, in the middle of the end wall on the high-pressure side between the bodies 6 and 12, whereas the part 19 of the outlet, which has a smaller cross section than the chamber 17, connects this chamber 17 to the outside of the housing 1.

Instead of the representation in FIG. 1, this part 18 may open tangentially in the chamber 17, for example on the top side opposite the cylindrical outer surface of the body 20.

In the chamber 17 is fixed a body 20 in the shape of a round disc, made of cellular material with open cells, on the elongated end 14A of the shaft 14.

The diameter of the body 20 is smaller than the diameter of the chamber 17 but larger than the diameter of the part 19 of the outlet 17-18-19, which is almost entirely sealed by the body 20.

The body 20 has a sufficiently low flow resistance in order to let gas, in particular gas or air under pressure, through.

This body 20 preferably consists of a hard foam made of synthetic material, metal or ceramic material.

A very suitable material for the body 20 is a metal foam made by depositing a metal layer, for example nickel or nickel chromium, by means of a galvanic process on a polyurethane foam and by subsequently removing this polyurethane foam by means of pyrolysis, or a foam of ceramic material made by depositing a ceramic material on a polyurethane foam and by subsequently thermally removing this polyurethane foam, for example by means of pyrolysis.

To the chamber 17 is connected a little discharge duct 21 which extends outside the housing 1 and onto which a pipe to a cooler can be connected.

Through the housing 1, an inlet 22 for the supply of the gas to be compressed to the room 4 extends on the opposite side of the outlet 17-18-19.

The working of the compressor is simple and as follows.

By means of the drive, the body 6 is rotated via the shaft 7, which rotates the body 12 in turn.

The gas to be compressed is brought in the room 4 via the inlet 22 and is compressed by the compressor elements 2 and 3. The compressed gas is discharged via the outlet 17-18-19 as indicated by the arrows 23.

This gas hereby flows through the rotating body 20 which is entirely incorporated in the housing 1, where the lubricating liquid particles situated in the gas are stopped and are radially flung out of the body 20 as indicated by the arrows 24.

These liquid particles are collected at the bottom of the chamber 17 and they are discharged to a cooler via the discharge duct 21 before they are added to the injected lubricating liquid again.

The compressor of which a part is represented in FIG. 2 differs from the one represented in FIG. 1 in that means are provided to make the compressed gas in the body 20 mainly flow in the direction of the shaft 14 and thus towards the geometrical axis of rotation of the body 20.

These means consist of a ring-shaped plate 25 which completely covers the side of the body 20 which is directed upstream and thus towards the part 18 of the outlet 17-18-19, and which is fixed against this body 20, for example glued onto it, and of a second ring-shaped plate 26 which is fixed to the opposite side of the body 20 but which only covers the outer part of this side.

The compressed gas flows via the chamber 17 of the outlet 17-18-19 and the outer edge of the body 20 in this body 20 and leaves the latter in the vicinity of the shaft 14 after the separation of the liquid particles which are radially flung outward.

The embodiment of the one-stage screw-type compressor as represented in FIG. 3 mainly differs from the embodiment according to FIG. 1 in that the body 20 has another design.

Instead of a foam disc, this body is formed of a round, disc-shaped brush with almost radially directed hairs 27. These hairs are caught in a core 28, for example a U-shaped groove in which the hairs 27 are clamped. This core 28 is fixed on the elongated end 14A of the shaft 14, for example glued, soldered or clamped onto it.

The compressed gas flows through the hairs 27 which form a filter. Liquid particles are stopped by the brush and are radially flung away when the shaft 14 rotates, after which they are collected in the chamber 17.

The flow of the gas through the body 20 and thus the hairs 27 is somewhat directed in the radial sense by means of a ring-shaped radial wall 29 which is provided on the upstream side of this body 20 on the elongated end 14A of the shaft 14, whereas the part 19 of the outlet 17-18-19 only opens centrally in this body 20. On the upstream side, the body 20 may be confined to this end by a radial wall which reaches as of the outer perimeter up to a distance from the shaft 14.

The embodiment of the compressor represented in FIG. 4 mainly differs from the embodiment represented in FIG. 2 in that the body 20 has a different composition on the one hand and in that the means for guiding the flow of compressed gas radially through this body 20 have a different construction on the other hand, so that the compressed gas cannot flow between the body and the downstream wall of the chamber 17 via the play.

The body 20 is formed of two ring-shaped layers 30 and 31 surrounding one another.

The outer ring-shaped layer 30 consists of woven metal wire. The inner ring-shaped layer 31 is formed of a combination of woven metal wire which is more tightly woven than the metal wire of the layer 30 and the synthetic fibres.

These synthetic fibres can be entirely or partly replaced by glass fibres.

Instead of the above-mentioned plates 25 and 26, the means for directing the flow radially through the body 20 contain a housing 32 in the shape of a hollow ring which surrounds the body 20 and which is connected to the end 14A of the shaft 14.

Moreover, this end 14A is provided with a passage 33-34 for the compressed air, namely an axial excavation 33 which opens in the free end of the shaft 14 on the one hand and thus in the downstream part 19 of the outlet 17-18-19 and in the inside of the housing 32 on the other hand, via openings 34 in the wall of the excavation 33, and as a result in the inner layer 31 of the body 20.

This housing 32 consists of two side walls 35 and 36 directed radially on the shaft 14 and a cylindrical outer wall 37 situated in between which surrounds the body 20 concentrically.

The upstream side wall 35 is provided with openings 38 opposite the outer layer 30, whereas the outer wall 37 is provided with openings 39 which open in the chamber 17.

Upstream of the body 20 and the housing 32 is provided a lip-shaped seal 40 in the ring-shaped opening between the end 14A of the shaft 14 and the housing 1 of the compressor.

Since there is little lubrication on the lip-shaped seal 40 and since the operating temperature may rise to 120° C. in the outlet 17-18-19, this lip-shaped seal 40 is preferably made of PTFE.

This lip-shaped seal 40 may be of what is called the reverse type, i.e. of the type which is lifted when the shaft 14 rotates due to the small pressure difference over the body 20, so that there is no contact or a minimal contact between the lip-shaped seal 40 and the shaft 14.

When a mixture of compressed air and a mass of liquid therein, which may be 6 to 8 times the mass of air, is pressed in the outlet 17-18-19, this mixture penetrates through the openings 38 of the housing 32 in the outer layer 30 of the body 20.

The metal wire cloth of this layer collects a large part, usually up to 99.99% by weight of the liquid which is flung away by the centrifugal force into the chamber 17 and which is discharged via the discharge duct 21.

The air which still contains small liquid particles further flows radially through the body 20 and thus through the inner layer 31, where said particles are retained.

The purified air leaves the body 20 through the openings 34 in the end 14A and flows via the excavation 33 in this end to the part 19 of the outlet 17-18-19.

Thanks to the two layers 30 and 31, a good separation is combined with a restricted pressure drop. If the body 20 would consist entirely of metal wire cloth with a relatively low density, the fine liquid particles would not be retained. If however, the body 20 would entirely consist of fibrous material with a relatively high density, the pressure drop would be high due to the long way and the high flow rate of the air, which would reduce the energy output of the compressor.

Thanks to the lip-shaped seal 40, the play between the body 20 surrounded by its housing 32 and the housing 1 of the compressor can be made sufficiently large.

As the lip-shaped seal 40 surrounds the end 14A, the sealing diameter is minimal. Since the diameter of this end 14A can be made very precisely, the pressing of the lip-shaped seal 40 can be easily kept under control.

The embodiment as represented in FIG. 5 differs from the above-described embodiment in that in the chamber 17, but upstream of the body 20 in the housing 32, is provided an extra body 41 in the shape of a brush with hairs 27 as in the embodiment according to FIG. 3.

Before the mixture of air and liquid penetrates into the double-layered body 20 through the openings 38 in the housing 32, it flows through the hairs 27 of the body 41, where the major part of the liquid, for example up to 99.9% by weight is retained, so that only the fine liquid particles still have to be retained in the body 41.

According to this embodiment, the body 20 could possibly only consist of the layer 31 or it could be made of cellular material with open cells as in the embodiment according to FIGS. 1 and 2.

Moreover, the body 41 can also be added in this embodiment according to FIGS. 1 and 2 and thus be applied without the air flowing through the shaft 14.

To the compressor of none of the above-described embodiments must be connected an air receiver or such for separating the lubricating liquid. The liquid separator which consists of the rotating body 20 in the chamber 17 is entirely incorporated in the housing 1, so that a compact whole is obtained which can be produced in an economical manner.

A major additional advantage of this construction is obtained in that the body 20 deadens the noise to a large extent, so that the noise level in the outlet pipe which is connected to the part 19 of the outlet is significantly reduced.

Instead of on a shaft 14 of the compressor element 3, the body 20 can be mounted on a shaft 8 of the compressor element 2, in which case the shaft 8 must have an elongated end which reaches into the outlet 17-18-19.

The invention is not restricted to screw-type compressors, but it can also be applied to other liquid-injected compressors, provided they have a rotating shaft in the outlet upon which a cellular body or a brush can be mounted, such as for example a spiral compressor.

The compressor can also be a multi-stage compressor. A body 20 may be provided in the outlet of the first stage as well as in the outlet of the second or subsequent stage, or also in the outlets of all the stages.

The present invention is by no means limited to the above-described embodiments represented in the accompanying drawings; on the contrary, such liquid-injected compressors can be made in all sorts of variants while still remaining within the scope of the invention.

What is claimed is:

1. A liquid-injected gas compressor, comprising:
   a housing defining an inner chamber;
   an inlet and an outlet in said housing connected to said inner chamber;
   at least two cooperating compressor elements mounted in said inner chamber, at least one of said compressor elements being rotatable and bearing-mounted with a shaft end in said housing, said shaft end being located in said outlet; and
   at least one body made of material that is permeable to gas, said body being fixed on said shaft end and forming a filter which virtually entirely seals said outlet and permits only flow of compressed gas therethrough.

2. A liquid-injected gas compressor according to claim 1, wherein said body is shaped as a disc.

3. A liquid-injected gas compressor according to claim 1, wherein said body is made of a material selected from the group consisting of metal, synthetic material and ceramic material.

4. A liquid-injected gas compressor according to claim 1, wherein said body is made of fibrous material.

5. A liquid-injected gas compressor according to claim 1, wherein said body comprises at least two layers surrounding one another.

6. A liquid-injected gas compressor according to claim 1, wherein said at least one body comprises an upstream body and a downstream body which are permeable to gas and are fixed on said shaft end one after the other.

7. A liquid-injected gas compressor according to claim 6, wherein said upstream body has a lower density than said downstream body.

8. A liquid-injected gas compressor according to claim 6, wherein said upstream body is a brush and said downstream body is made of a material selected from the group consisting of cellular material with open cells and fibrous material.

9. A liquid-injected gas compressor according to claim 1, wherein said compressor is a screw-type compressor having rotatable helical compressor elements and said body is mounted on a shaft end of any of said helical compressor elements.

10. A liquid-injected gas compressor according to claim 1, further comprising:
    a filter chamber formed as an enlargement of said outlet, said body being located in said filter chamber.

11. A liquid-injected gas compressor according to claim 10, further comprising:
    a small discharge duct connected to said chamber.

12. A liquid-injected gas compressor according to claim 1, wherein said body is made of cellular material with open cells.

13. A liquid-injected gas compressor according to claim 12, wherein said body is made by first coating synthetic foam having open cells with metal in a galvanic manner and subsequently thermally removing said synthetic foam.

14. A liquid-injected gas compressor according to claim 12, wherein said body is made by first coating synthetic foam having open cells with ceramic material and subsequently thermally removing said synthetic foam.

15. A liquid-injected gas compressor according to claim 23, wherein said body comprises:

an outer layer made of woven metal wire; and an inner layer made of a combination of woven metal wire and a material selected from the group consisting of synthetic fiber and glass fiber.

16. A liquid-injected gas compressor according to claim 1, wherein said body is a brush.

17. A liquid-injected gas compressor according to claim 1, wherein said body is a brush with almost radially directed bristles.

18. A liquid-injected gas compressor according to claim 1, further comprising:

a flow control arrangement causing compressed gas to flow at least partially towards a geometrical axis of rotation of said body.

19. A liquid-injected gas compressor according to claim 18, wherein said flow control arrangement comprises a plate which at least partially covers a side of said body that faces upstream.

20. A liquid-injected gas compressor according to claim 18, wherein said flow control arrangement comprises a side wall of a ring housing of said body which at least partially covers a side of said body facing upstream.

21. A liquid-injected gas compressor according to claim 18, wherein said flow control arrangement comprises a first plate which at least partially covers a side of said body facing upstream and a second plate which partially covers an opposite downstream facing side of said body.

22. A liquid-injected gas compressor according to claim 18, wherein said flow control arrangement comprises a side wall of a ring housing of said body which at least partially covers a side of said body facing upstream and a plate which partially covers an opposite downstream facing side of said body.

23. A liquid-injected gas compressor according to claim 18, further comprising:

an elongated shaft end of said shaft end in said outlet; and a passage provided in said elongated shaft end, said passage opening radially in said body and opening in said outlet downstream of said body.

24. A liquid-injected gas compressor according to claim 23, wherein said body is sealed on a downstream side by a plate.

25. A liquid-injected gas compressor according to claim 23, wherein said body is sealed on a downstream side by a side wall.

26. A liquid-injected gas compressor according to claim 23, further comprising:

a seal which secures a space between said housing and said shaft end downstream of said body.

27. A liquid-injected gas compressor according to claim 26, wherein said seal is a lip-shaped seal.

* * * * *